United States Patent Office 3,350,494
Patented Oct. 31, 1967

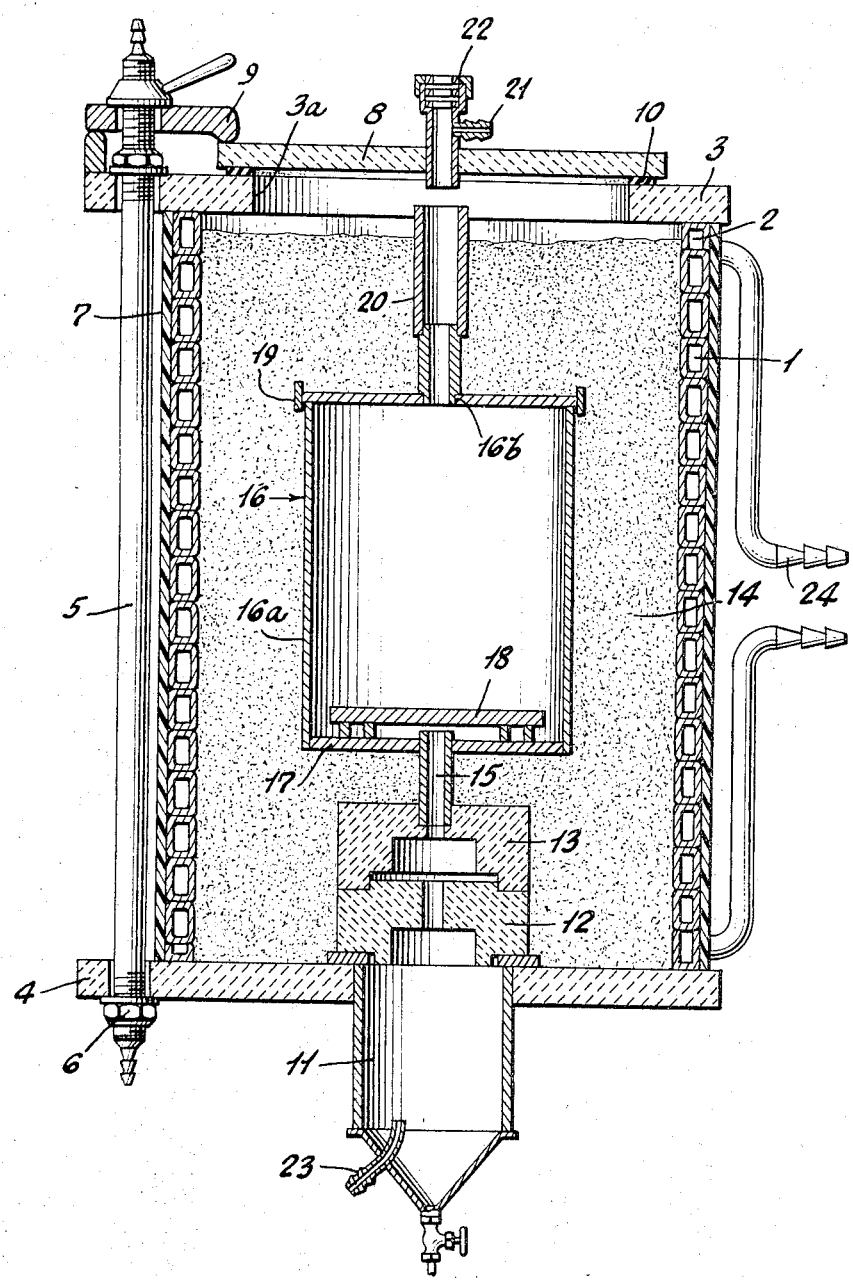

3,350,494
INDUCTION FURNACE
Valery Nickolaevich Kunitsky, Boris Pavlovich Lobashev, Mikhail Naumovich Stetsovsky, and Alexei Agapovich Fomin, Moscow, U.S.S.R., assignors to Tsentralny Nauchno-Issledovatelsky Institute Chernoi Metallurgii imeni I. P. Bardina, Moscow, U.S.S.R.
Filed Jan. 12, 1965, Ser. No. 424,993
2 Claims. (Cl. 13—27)

ABSTRACT OF THE DISCLOSURE

An induction furnace for heating a workpiece in a controlled atmosphere and comprises an upper wall, a lower wall and a side wall. The side wall is constituted by an induction coil, the turns of which are embedded in a layer of glass plastic thereby providing a strong, sealed jacket. A working chamber for receiving the workpiece to be heated is supported within the furnace and a heat insulated material fills the space between the upper, lower and side walls and the working chamber. A drip pan is supported by the lower wall of the furnace and is adapted to communicate with the working chamber. Means are provided for introducing a control gas into the working chamber for discharge through the drip pan and further means are included for cooling the induction coil.

---

The present invention relates to induction furnaces and more particularly to induction furnaces for heating in a controlled atmosphere provided with a cooled inductor complete with a heat-insulating ceramic filling between the inductor and the working chamber.

There are known induction furnaces for heating in a controlled atmosphere which include a cooled inductor and a heat insulating ceramic filling. In these furnaces, a quartz or ceramic pipe is used as a sealed jacket.

When operating the above mentioned furnaces at a temperature over 1600° C., the quartz is likely to develop cracks because of the prolonged heating in a hydrogen atmosphere. Moreover, the dimensions of the working chamber of furnaces having a quartz or ceramic pipe are limited, as there is no possibility for manufacturing such pipes of sufficiently large diameters.

A principal object of this invention is the provision of an industrial, high-temperature induction furnace for the high heating of work-pieces.

A further object of the present invention is to provide for sintering large work-pieces made from molybdenum, tungsten, and their alloys in a hydrogen atmosphere in the above mentioned furnaces.

Another object of this invention is to decrease the dimensions of the induction furnace.

Broadly, to accomplish the above and other advantageous objects, the furnace includes upper and lower wall means and a side wall means defined by an induction coil with the turns of the coil being embedded in a layer of glass plastic for providing a strong sealed jacket, means constituting a working chamber for receiving the workpiece to be heated is supported within the furnace, a heat insulating material fills the space between the walls of the furnace and the working chamber, a drip pan supported by the lower wall is adapted to communicate with the working chamber, means for introducing the control gas into the working chamber for discharge through the drip pan and further means for cooling the induction coil.

Other objects and advantages of the present invention will become apparent from a consideration of the following detailed description of a preferred embodiment, taken in conjunction with the appended drawing showing diagrammatically a cross-sectional view of the induction furnace.

Inductor 1 of the furnace is made of a copper pipe having a cross section in the shape of a rectangle provided with bevelled edges. U-shaped extension pieces 2 welded to the end coils of the inductor 1 provide for the formation of a plane surface.

The coils of the inductor 1 are wrapped by a glass-micanite band and placed between upper and lower plates 3 and 4 and the plates are drawn together by four brass pipes 5 (only one of which is shown in the drawing) and the ends of the pipes and equipped with nuts 6.

Outer surface 7 of the inductor 1 is coated (in layers) with an epoxy compound and glass cloth thereby forming a solid layer of the glass plastic. Cavities provided on the inductor surface contribute to a better adhesion of the coating.

A hole 3a in the plate 3 is closed by means of a water-cooled cover 8 which is fastened with four clamps 9 (only one clamp being shown in the drawing) to the plate 3 and a rubber gasket 10 surrounding the hole effectively seals the furnace jacket.

The plates 3, 4 and cover 8 are of glass textolite having dielectric properties instead of the conventional metallic components whereby it is possible to preclude power losses tha are usually caused by eddy currents induced in those parts.

In the lower plate 4 is mounted a water-cooled receptacle or drip pan 11 and ceramic supports 12 and 13 are disposed thereabove. A heat-insulating filling 14 is placed in the space between the supports 12, 13, and the inductor 1. An Alundum tube 15 prevents the filling from entering a hole of the upper support 13.

On a layer of the filling, immediately above the support 13, is mounted a working chamber 16 in the form of a cylinder 16a of molybdenum and which is provided with a bottom 17. On the bototm 17 is mounted table 18 for supporting the work-piece to be heated, e.g. a molybdenum blank.

The upper end of the cylinder 16a is provided with a removable cover 19 of molybdenum having a centrally located hole 16b into which a sight pipe 20 is inserted. The remaining space between the cylinder 16a and the inductor 1 is also filled with the heat-insulating filling 14.

Upon charging the furnace, the air therein is pumped through the drip pan 11, while hydrogen is introduced through a connection branch 21 in a sight pipe 22 and a connection branch 23 in the drip pan 11. The inductor is cooled through connection branches 24.

The operation of the invention is as follows:

The workpiece to be heated is located within the working chamber and the alternating electromagnetic field produced by the induction coil 1 which serves as a side wall of the furnace induces currents in the top, side and bottom walls of the working chamber 16 thereby heating such chamber to the required temperature. The workpiece is heated by the heat transferred from the walls of the working chamber.

Upon completion of the heating process, the workpiece is cooled in a gas atmosphere to room temperature after which the chamber has introduced therein an inert gas. Thereafter, the cover 8 is removed, the heat insulating filling material is removed from the top of the working chamber whereby the workpiece treated may be taken therefrom. The furnace is charged in reverse order.

Aluminium oxide ($Al_2O_3$) or zirconium oxide ($ZrO_2$) is employed as a refractory, heat-insulating filling. Hence, with the thickness of the refractory layer between the inductor 1 and the cylinder 16a of the working chamber 16 being equal to 150 mm., the cylinder can be heated up to high temperatures, viz up to 1900° C. when filling with aluminium oxide, and up to 2300° C. when filling with zirconium oxide. Under such conditions, the temperature of the inductor 1 does not exceed 40 to 60° C., which provides for the solidity and density of the glass-plastic layer.

An experimental furnace has been built up as an embodiment of this invention with the working chamber sized 350 x 500 mm. and capable of sintering large-size workpieces of high-melting metals and their alloys at a temperature of up to 2300° C.

The invention is not to be confined to any strict conformity to the showings in the drawings but changes or modifications may be made therein so long as such changes or modifications mark no material departure from the spirit and scope of the appended claims.

We claim:

1. An induction furnace for heating a workpiece in a controlled atmosphere, comprising an upper wall, a lower wall and a side wall, said side wall being defined by an induction coil, the turns of said coil being embedded in a layer of glass plastic thereby providing a strong, sealed jacket, means constituting a working chamber for receiving the workpiece to be heated, means for supporting said working chamber within the furnace, a heat insulating material filling the space between said upper, lower and side walls and said working chamber, a drip pan supported by the lower wall adapted to communicate with the working chamber, means for introducing a controlled gas into said working chamber for discharge through said drip pan, and means for cooling the induction coil.

2. The induction furnace as claimed in claim 1 in which said layer of glass plastic includes a glass-micanite band wrapped about the turns of said coil and a coating of an epoxy compound thereon, and said upper and lower walls being of glass textolite.

References Cited

UNITED STATES PATENTS

| | | | |
|---|---|---|---|
| 1,940,256 | 12/1933 | Krebs | 13—31 |
| 1,971,195 | 8/1934 | McKibben | 13—27 X |
| 2,793,242 | 5/1957 | Beckius et al. | 13—27 |
| 2,826,624 | 3/1958 | Reese et al. | 13—27 |
| 2,875,556 | 3/1959 | Vigna et al. | 13—27 X |
| 2,888,541 | 5/1959 | Netzer | 219—10.41 |
| 3,156,549 | 11/1964 | Kelemen | 219—10.49 X |
| 3,222,446 | 12/1965 | Kolle | 219—10.79 X |

ANTHONY BARTIS, *Primary Examiner.*

RICHARD M. WOOD, *Examiner.*

L. H. BENDER, *Assistant Examiner.*